United States Patent
Lee et al.

(10) Patent No.: US 8,967,011 B2
(45) Date of Patent: Mar. 3, 2015

(54) DOUBLE RACK GEAR STRUCTURE FOR SUPPORTING POP-UP MONITOR

(75) Inventors: Joung Hoon Lee, Yongin-si (KR); Wan Woo Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 266 days.

(21) Appl. No.: 13/413,753

(22) Filed: Mar. 7, 2012

(65) Prior Publication Data
US 2013/0025393 A1 Jan. 31, 2013

(30) Foreign Application Priority Data
Jul. 26, 2011 (KR) ........................ 10-2011-0074184

(51) Int. Cl.
| | | |
|---|---|---|
| *F16H 57/12* | (2006.01) | |
| *F16M 11/18* | (2006.01) | |
| *B60R 11/02* | (2006.01) | |
| *F16M 11/04* | (2006.01) | |
| *F16M 11/24* | (2006.01) | |
| *B60R 11/00* | (2006.01) | |

(52) U.S. Cl.
CPC ................ *F16M 11/18* (2013.01); *B60R 11/02* (2013.01); *F16M 11/046* (2013.01); *F16M 11/24* (2013.01); *B60R 11/0235* (2013.01); *B60R 2011/0082* (2013.01); *B60R 2011/0092* (2013.01)
USPC .............................................. 74/425; 74/458

(58) Field of Classification Search
CPC ............ F16H 1/16; F16H 51/00; F16H 1/04; F16H 2057/0213; F16H 55/24
USPC ............................ 74/425, 426, 427, 431, 458
See application file for complete search history.

(56) References Cited

U.S. PATENT DOCUMENTS

| | | | | |
|---|---|---|---|---|
| 3,094,007 | A | | 6/1963 | Luhrs |
| 3,771,781 | A | * | 11/1973 | Lackey et al. ................ 269/218 |
| 4,046,019 | A | * | 9/1977 | Phillips ............................ 74/29 |
| 4,168,595 | A | * | 9/1979 | Pickles et al. ................... 49/352 |
| 4,182,078 | A | * | 1/1980 | Bartholomew ................ 49/140 |
| 4,226,136 | A | * | 10/1980 | Porter et al. .................... 74/416 |
| 4,522,394 | A | * | 6/1985 | Broussard ..................... 473/483 |
| 4,686,863 | A | * | 8/1987 | Inoue et al. .................... 74/425 |

(Continued)

FOREIGN PATENT DOCUMENTS

| | | |
|---|---|---|
| BE | 482 344 A | 5/1948 |
| FR | 2 369 993 A1 | 6/1978 |
| GB | 1 550 072 A | 8/1979 |

OTHER PUBLICATIONS

European Extended Search Report issued on Apr. 17, 2014 in counterpart European Application No. 12153867.2 (8 Pages).

*Primary Examiner* — David M Fenstermacher
(74) *Attorney, Agent, or Firm* — NSIP Law

(57) ABSTRACT

A gear structure is configured to support vertical motion of an electric pop-up monitor. More specifically, a double rack gear structure is configured to support a pop-up monitor. The rack gear structure includes an outer gear and an inner gear. The outer gear is coupled at a side of the monitor frame to operate integrally with the monitor frame, and enables the vertical motion of the monitor frame with an ascending or descending motion. The inner gear is received inside the outer gear. The inner gear performs an ascending or descending motion simultaneously with the outer gear, and supports forward and rearward or right and left shaking, which occurs in the outer gear, by maximizing a portion overlapping with the outer gear when the outer gear has ascended to the maximum.

20 Claims, 9 Drawing Sheets

(56) References Cited

U.S. PATENT DOCUMENTS

| | | | |
|---|---|---|---|
| 5,042,315 A * | 8/1991 | Fahy et al. | 74/411 |
| 5,712,761 A * | 1/1998 | Dials et al. | 361/679.35 |
| 5,794,480 A * | 8/1998 | Schonsteiner | 74/425 |
| 6,167,770 B1 * | 1/2001 | Nass | 74/425 |
| 6,267,020 B1 * | 7/2001 | Macchiarella et al. | 74/89.17 |
| 6,404,084 B1 * | 6/2002 | Niki et al. | 310/75 R |
| 6,568,454 B1 * | 5/2003 | Mullet et al. | 160/188 |
| 6,712,727 B2 * | 3/2004 | Kujira et al. | 475/149 |
| 6,722,222 B1 * | 4/2004 | Dolan et al. | 74/422 |
| 6,952,976 B2 * | 10/2005 | Roither et al. | 74/425 |
| 7,413,163 B2 * | 8/2008 | Maxwell et al. | 251/250 |
| 8,205,517 B2 * | 6/2012 | Fukushima et al. | 74/409 |
| 2007/0030647 A1 | 2/2007 | Chen et al. | |

* cited by examiner

DOUBLE RACK GEAR STRUCTURE FOR SUPPORTING POP-UP MONITOR

CROSS-REFERENCE TO RELATED APPLICATIONS

This application claims priority under 35 U.S.C. §119 to Korean Patent Application No. 10-2011-0074184, filed on Jul. 26, 2011, the disclosure of which is incorporated herein by reference in its entirety.

TECHNICAL FIELD

The present disclosure relates to a gear structure for supporting a vertical motion of an electric pop-up monitor, and in particular, to a double rack gear structure for supporting a pop-up monitor.

BACKGROUND

Recently, as the functions and quality of vehicles are highly enhanced, various monitors for controlling an air-conditioning apparatus, a navigator, a Liquid Crystal Display (LCD) television (TV), etc. are installed in the vehicles. Such monitors are categorized into rear monitors and front monitors. The rear monitor is disposed in the rear of a driver's seat or a console and operated by a passenger of a back seat. The front monitor is installed on a display panel in front of a vehicle body and operated by a passenger of a front seat such as a driver's seat or a passenger seat.

The front monitor mounted on the display panel is configured such that a frame with a monitor mounted thereon is popped up in order for a driver to more easily look at the front monitor. As such pop-up types, there are a pop-up type where the monitor frame is vertically popped up, a pop-up type where the monitor frame is popped up while rotating, and a pop-up type where the monitor frame moves horizontally and then is popped up while rotating vertically.

Among such pop-up types, the pop-up type where the monitor frame is vertically popped up is illustrated in FIG. 1.

FIG. 1 is a partially cut rear view illustrating an operation of a related art electric pop-up monitor for a vehicle.

Referring to FIG. 1, a related art electric pop-up monitor 1 for a vehicle includes a body 3 mounted on one side of a crush pad of a vehicle, a monitor 4 disposed in the body 3, and a driver 5 that lifts and drops the monitor 4 with respect to the body 3.

That is, a guide protrusion 6 being a guide that allows the monitor 4 to ascend and descend with respect to a space portion formed inside the body 3 is lengthily formed upward and downward to protrude in an internal direction from one side of the body 3. Such a guide groove 7 coupled to the guide protrusion 6 is formed in one side of the monitor 4.

The driver 5 is disposed between the body 3 and a rear surface on the reverse of a portion forming a screen 8 in front of the monitor 4. Herein, the driver 5 includes a motor 9 generating a torque, and a plurality of gears such as a driven gear 10 transferring the torque of the motor 9. A worm gear 11 is disposed in a rotational axis of the motor 9, and a worm wheel gear 13 is disposed in a driven shaft 12 interlocking with the driven gear 10. A pinion gear 14 coupled to the driven gear 10 rotates about a pinion axis 15. In this case, the pinion axis 15 and the driven shaft 12 are supported in one side of the body 3. Furthermore, a rack gear 17 where a spur gear 16 is vertically formed is disposed in a rear surface of the monitor 4.

As described above, a related art pop-up monitor drives a monitor upward and downward by coupling with the spur gear that is formed in the pinion gear and the rack gear, and the monitor that has completely ascended in an upper direction with respect to the body is supported by gear engagement. In this case, since a portion supporting the ascended monitor is narrow, the monitor is easily shaken upward and downward or from side to side by vibration that occurs in driving a vehicle.

Moreover, in the related art, since the spur gear formed in the rack gear is exposed to the outside, there is much possibility that the driving of a vehicle is failed due to foreign substances.

SUMMARY

Accordingly, the present disclosure provides a double rack gear structure, which allows the vertical driving of a monitor to be performed by an internally touched double rack gear that is disposed in each of both sides of the monitor, and thus increases a support power to the monitor when the monitor has ascended to the maximum with respect to a body.

The object of the present invention is not limited to the aforesaid, but other objects not described herein will be clearly understood by those skilled in the art from descriptions below.

In one general aspect, a rack gear structure of a pop-up monitor, which is connected to a monitor frame of the pop-up monitor to enable a vertical motion of the monitor frame, includes: an outer gear coupled at a side of the monitor frame to operate integrally with the monitor frame, and enabling the vertical motion of the monitor frame with an ascending or descending motion, and an inner gear received inside the outer gear, wherein the inner gear performs an ascending or descending motion simultaneously with the outer gear, and supports forward and rearward or right and left shaking, which occurs in the outer gear, by maximizing a portion overlapping with the outer gear when the outer gear has ascended to the maximum.

A rail groove may be formed along a length direction, at one surface inside the outer gear. A rail may be formed along a length direction, at one surface of the inner gear, and the inner gear may be received inside the outer gear through coupling between the rail and the rail groove.

A spur gear teeth may be formed in one row along a length direction, at one side inside the outer gear, and a spur gear teeth may be formed in one row along a length direction, at one side inside the inner gear.

A through hole may be formed in the inner gear, and a guide shaft may be disposed in the through hole.

The outer gear may change a first rotational motion, transferred from a motor, to a first rectilinear motion, and the inner gear may change a second rotational motion, transferred from the motor, to a second rectilinear motion.

The outer gear and the inner gear may be coupled to a driving unit which transfers a rotational motion generated by a motor, the driving unit may include a spur gear set configured with first and second spur gears, the first spur gear may be coupled to the outer gear, and the second spur gear may be coupled to the inner gear.

The first spur gear and the second spur gear may be coupled to rotate integrally, and a diameter of the first spur gear may be formed greater than a diameter of the second spur gear.

The driving unit may include: a motor; a first gear set transferring a torque of the motor to a rotational shaft; a second gear set coupled to the first gear set; and a rotational shaft rotating according to an output of the motor, and the first and second spur gears may be fixed and coupled to both ends of the rotational shaft, respectively.

The first gear set may include: a clutch gear coupled to a worm gear which is installed in a driving shaft of the motor; and a complex gear coupled to the clutch gear.

The clutch gear may include: a shaft; a helical gear disposed in an upper portion with respect to the shaft; a spur gear disposed in a lower portion with respect to the shaft; an extension spring placed inside the helical gear; and a friction pad placed between the helical gear and the spur gear, the helical gear may be coupled to a worm which is installed in the driving shaft to receive a motive power from the motor, and the spur gear may be coupled to the complex gear while rotating integrally with the helical gear to transfer a motive power.

The clutch gear may include a helical gear in an upper portion thereof, and a spur gear in a lower portion thereof, the helical gear may be coupled to the worm gear installed in the driving shaft to receive a motive power from the motor, and the spur gear may be coupled to the complex gear while rotating integrally with the helical gear to transfer a motive power.

The second gear set may be configured with a complex gear which is fixed and coupled to the rotational shaft and includes a helical gear and a spur gear which rotate integrally with the rotational shaft, the helical gear of the second gear set being coupled to the helical gear of the complex gear to receive a motive power.

The rack gear structure may further include a pressurizing member applying a pressure in a direction perpendicular to a vertical moving direction of the outer gear.

A groove having a certain width may be formed along a length direction, in an outer surface of the outer gear, and the pressurizing member may continuously apply a constant pressure to the outer gear along the groove, when the monitor frame ascends or descends in a vertical direction.

In another general aspect, a rack gear structure of a pop-up monitor, including a monitor frame which ascends and descends, includes: a linear outer gear coupled to the monitor frame; and a linear inner gear disposed inside the outer gear, wherein the linear inner gear ascends or descends according to an ascending or descending motion of the linear outer gear.

The linear outer gear may ascend within a distance range of about 100 mm to 130 mm, and the linear inner gear may ascend within a distance range of about 50 mm to 65 mm according to an ascending motion of the linear outer gear.

The linear outer gear may ascend within a distance range of about 105 mm to 115 mm, and the linear inner gear may ascend within a distance range of about 55 mm to 60 mm according to an ascending motion of the linear outer gear.

When the linear outer gear and the linear inner gear ascend to the maximum, the linear outer gear and the linear inner gear may overlap with each other within a distance range of about 80 mm to 95 mm.

The rack gear structure may further include a pressurizing member applying a pressure in a direction perpendicular to a vertical moving direction of the linear outer gear.

The pressurizing member may include: a case-damping spring installed to be externally touched to the linear outer gear; and a torsion spring assembled with the case-damping spring to apply a moment to the case-damping spring.

Other features and aspects will be apparent from the following detailed description, the drawings, and the claims.

DETAILED DESCRIPTION OF EMBODIMENTS

Figure 1:
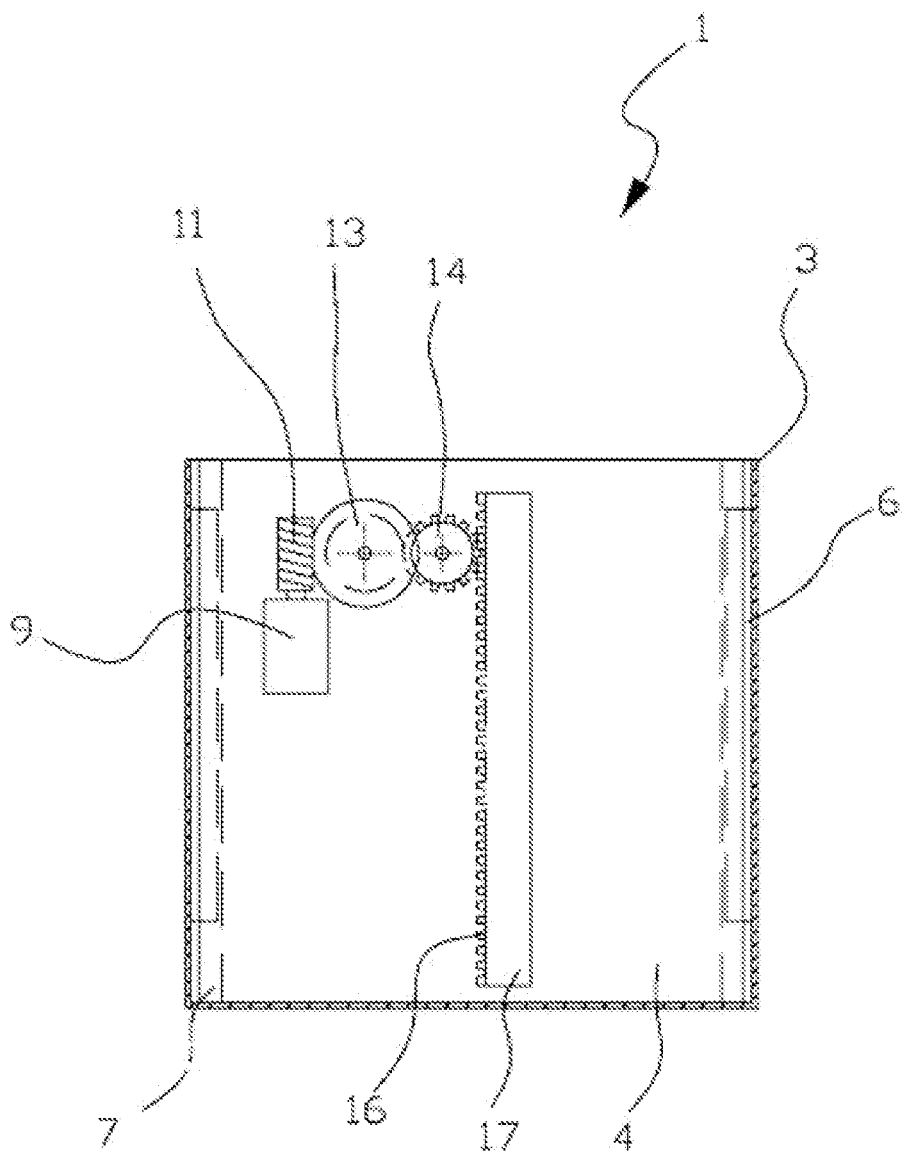
FIG. 1 is a partially cut rear view illustrating an operation of a related art electric pop-up monitor for a vehicle.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the following description, the technical terms are used only for explaining a specific exemplary embodiment while not limiting the inventive concept. The terms of a singular form may include plural forms unless specifically mentioned.

Hereinafter, exemplary embodiments of the inventive concept will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 2A:
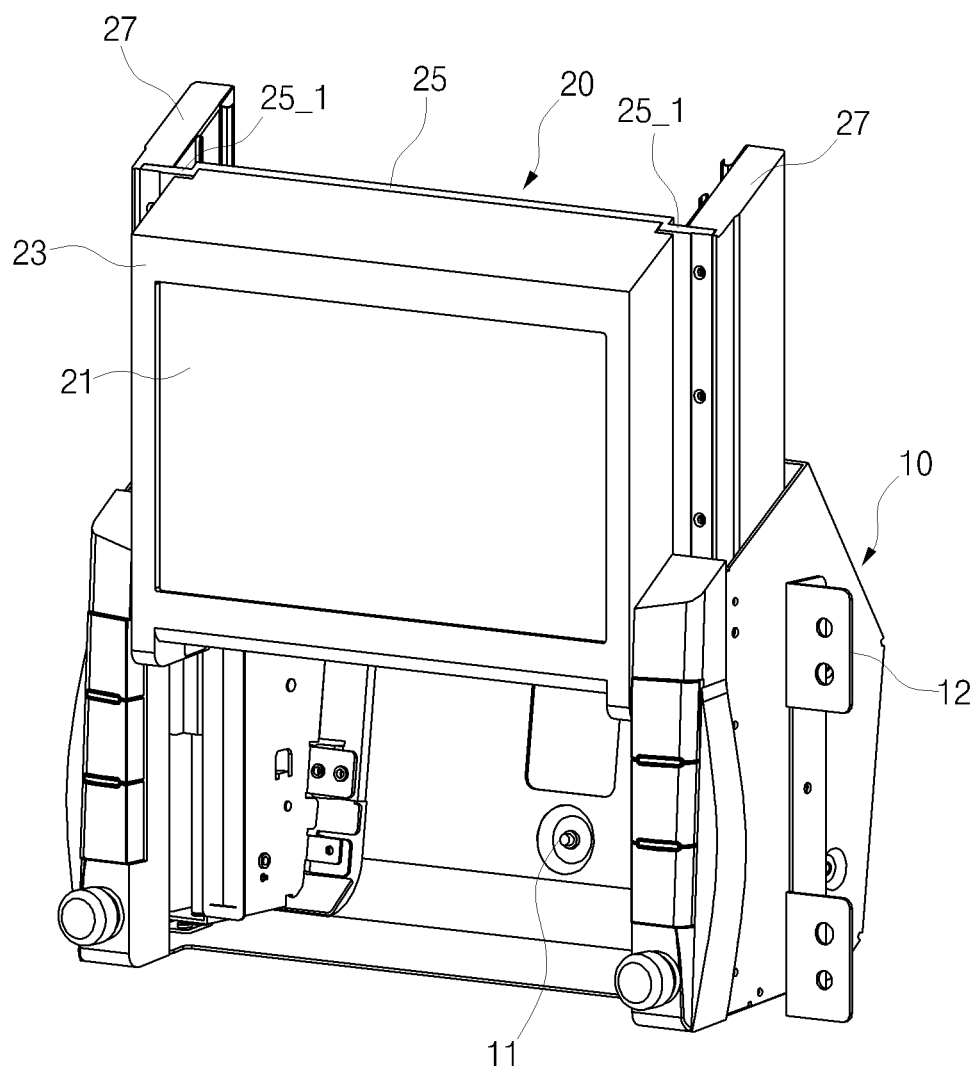
FIG. 2a and FIG. 2b are a perspective view illustrating a pop-up monitor with a double rack gear structure, according to an embodiment of the present invention.
Figure 2B:
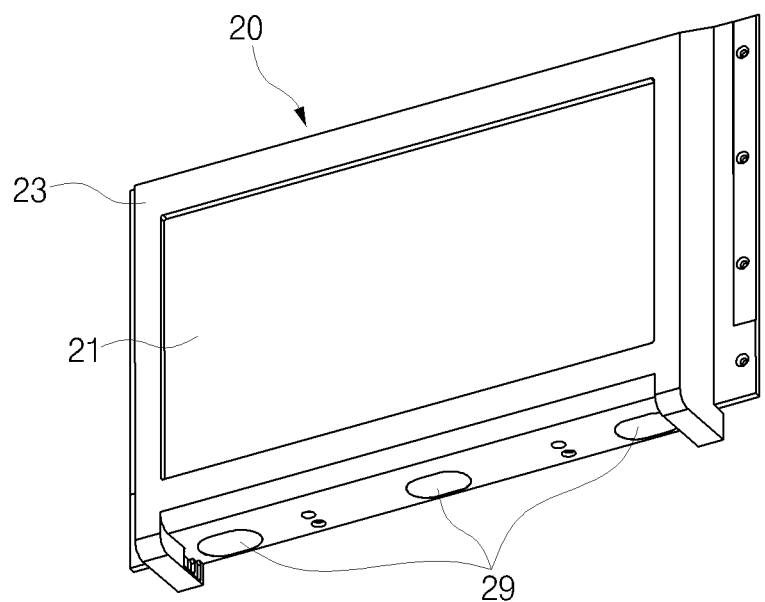

FIG. 2a and FIG. 2b are a perspective view illustrating a pop-up monitor with a double rack gear structure, according to an embodiment of the present invention.

Referring to FIG. 2 and FIG. 2b, the pop-up monitor according to an embodiment of the present invention includes a body housing 10 that is received in a crash pad mounted on the front inside a vehicle, a monitor frame 20 that is installed to be moved in a direction vertical to the body housing 10, and a driving unit (illustrated in FIG. 5) that is disposed in order for the monitor frame 20 to move in a vertical direction.

The body housing 10 is received in the crash pad that is installed in a center facia of the front inside the vehicle, and supports the monitor frame 20 such that the monitor frame 20 is shown in a vertical direction on the crash pad.

The inside of the body housing 10 is empty, and thus, the body housing 10 secures a space for receiving portable equipment such as a Personal Digital Assistant (PDA), an MP3 player, and a mobile communication terminal. A connector 11 for supplying a power to the portable equipment is provided in one end of the body housing 10.

A Universal Serial Bus (USB) port enabling communication with the portable equipment may be provided in one end inside the body housing 10.

By coupling a screw (not shown) to the crash pad with a coupling part 12 that is formed to protrude in each of both sides of the body housing 10, the body housing 10 may be fixed to the crash pad.

The monitor frame 20 is installed to be moved in a direction vertical to the body housing 10. The monitor frame 20 includes a case 23 that is coupled to a rear side of a monitor 21 to support the monitor 21, and a support frame 25 that is coupled to a rear side of the case 23 to support a vertical motion of the case 23.

The support frame 25 is fixed to the case 23 through screw coupling with the rear side of the case 23, and includes a wing-shaped coupling member 25_1 that is formed to protrude in each of both sides of the case 23.

Moreover, the monitor frame 20 may further include a rack gear set 27 that induces a vertical motion of the monitor frame 20 by sliding in a vertical direction with respect to the body housing 10. The rack gear set 27 may be fixed to the coupling members 25_1 that are respectively formed to protrude in both sides of the support frame 25, through screw coupling.

In the embodiment, the rack gear set 27 includes an outer gear that is fixed and coupled to the coupling members 25_1 to support the vertical motion of the monitor frame 20, and an inner gear that is received inside the outer gear to support a vertical motion of the outer gear through rail coupling with the outer gear. The rack gear set 27 will be specifically described below with reference to FIGS. 3 to 5.

Figure 3:
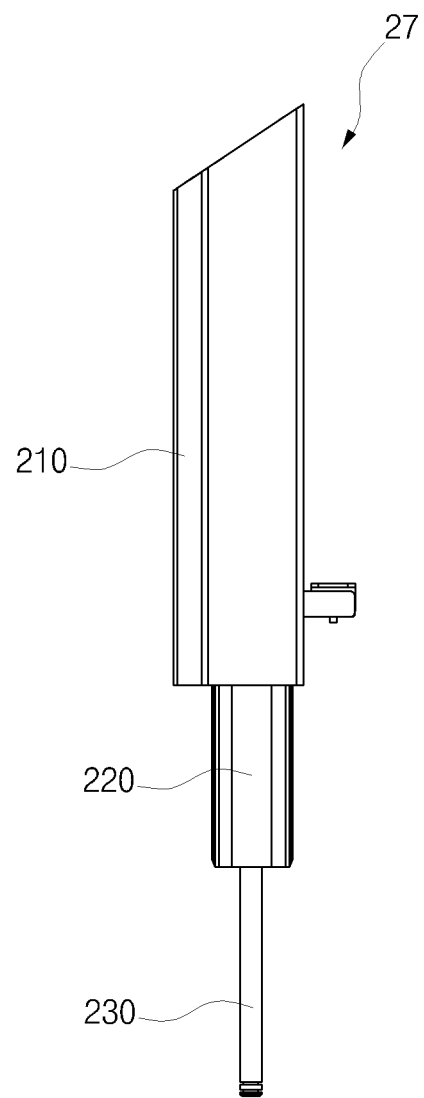
FIG. 3 is a front-sectional view schematically illustrating a rack gear set according to an embodiment of the present invention.
Figure 4:
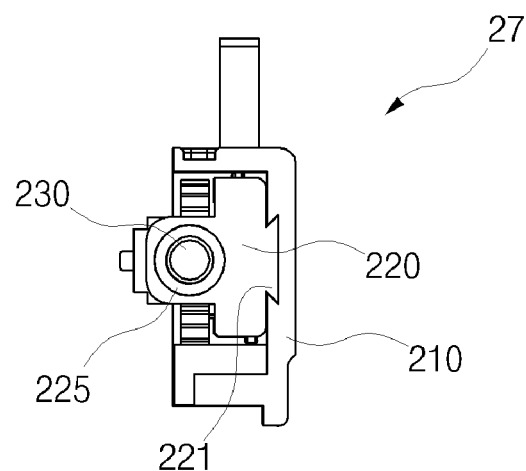
FIG. 4 is a top-sectional view schematically illustrating a rack gear set according to an embodiment of the present invention.
Figure 5:
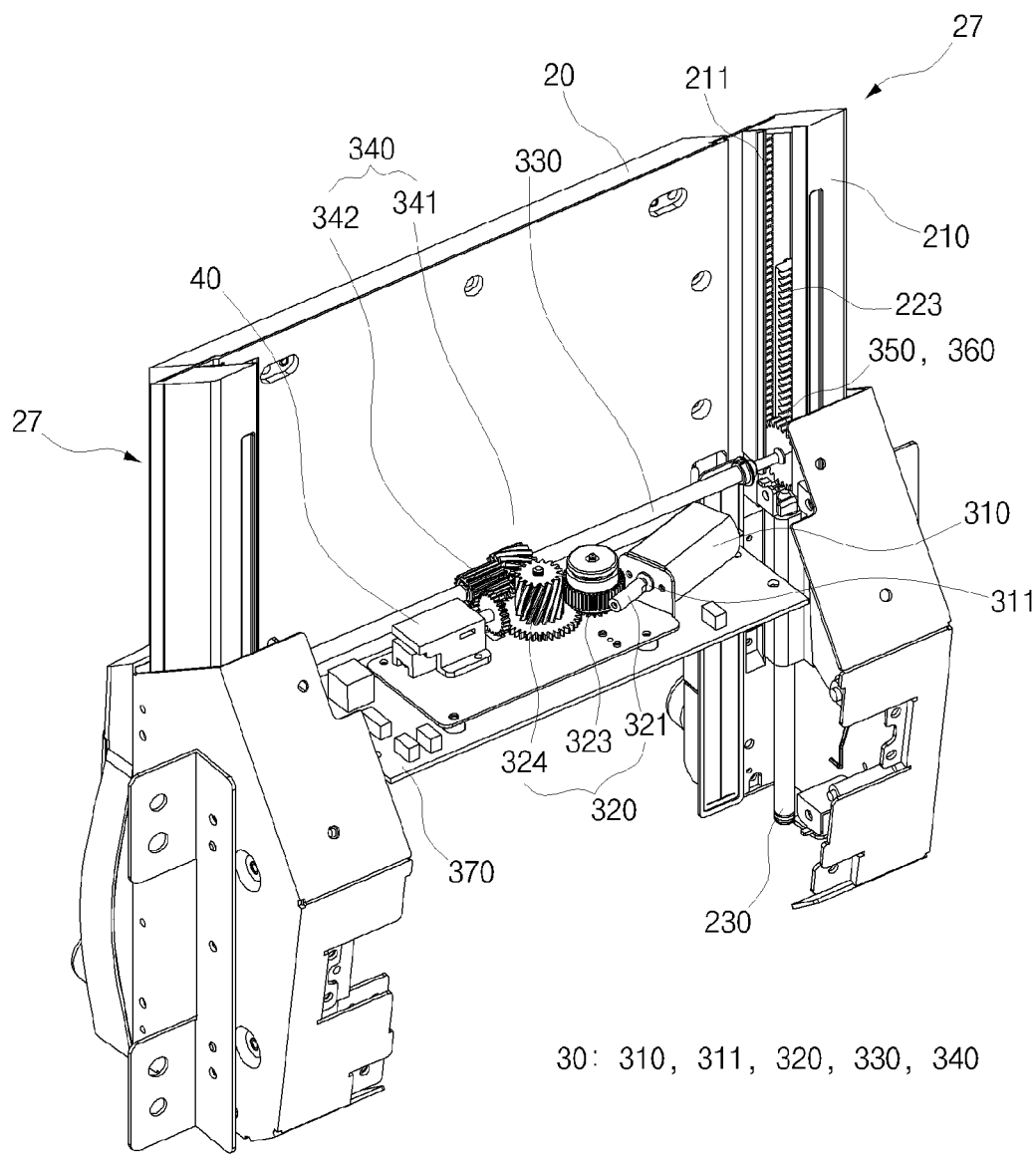
FIG. 5 is a perspective view schematically illustrating a rack gear set according to an embodiment of the present invention.

FIG. 3 is a front-sectional view schematically illustrating a rack gear set according to an embodiment of the present invention. FIG. 4 is a top-sectional view schematically illustrating a rack gear set according to an embodiment of the present invention. FIG. 5 is a perspective view schematically illustrating a rack gear set according to an embodiment of the present invention.

The rack gear set 27, as illustrated FIGS. 3 to 5, includes an outer gear 210, an inner gear 220, and a guide shaft 230.

The outer gear 210 is installed in each of both sides of the monitor frame 20. The outer gear 210 is fixed to the coupling member 25_1 of the support frame 25 through screw coupling and operates integrally with the monitor frame 20.

The outer gear 210 has a ⌐-shape with an internal space. A spur gear teeth 211 is formed in one row along a length direction, in one side inside the outer gear 210. In this case, the spur gear teeth 211 is coupled to a first spur gear of a driving unit 30 (which will be described below with reference to FIG. 7) to change a first rotational motion, transferred through the first spur gear, to a first rectilinear motion, thereby enabling the vertical motion of the monitor frame 20 that is fixed and coupled to the outer gear 210.

Moreover, a rail groove is formed along a length direction in one end inside the outer gear 210, and the below-described inner gear 220 supports a vertical motion by sliding in a vertical direction along the rail groove.

The inner gear 220 is placed in an internal space of the outer gear 210, and a rail 221 is formed along a length direction, in one end of the inner gear 220. In this case, the rail 221 may be inserted into the rail groove, and a vertical motion of the inner gear 220 is supported through rail coupling between the rail groove of the outer gear 210 and the rail 221.

Moreover, a spur gear teeth 223 is formed along a length direction even in one side inside the inner gear 220. The spur gear teeth 223 is coupled to a second spur gear of the driving unit 30 (which will be described below with reference to FIG. 7) to change a second rotational motion, transferred through the second spur gear, to a second rectilinear motion, thereby enabling the vertical motion of the inner gear 220.

The guide shaft 230 is inserted into a through hole 225 that is formed in the inner gear 220, and guides a vertical motion of the inner gear 220. The guide shaft 230 supports the inner gear 220 from forward and rearward/right and left shaking that occurs when the inner gear 220 ascends.

According to the embodiment, as described above, the vertical motion of the monitor frame 20 is supported by the rack gear set 27, which includes the outer gear 210 that is fixed and coupled to the monitor frame 20 to directly induce the vertical motion of the monitor frame 20, and the inner gear 220 that is received in the internal space through rail coupling with the outer gear 210.

That is, in the embodiment, the rack gear set 27 rack gear set is characterized by having the double rack gear structure of the outer gear 210 and inner gear 220. Herein, the inner gear 220 is not directly associated with the vertical motion of the monitor frame 20, but when the inner gear ascends simultaneously with the outer gear 210 and then the outer gear 210 has ascended to the maximum, by maximizing a portion overlapping with the outer gear 210, the inner gear 220 can support forward and rearward/right and left shaking that occurs in the outer gear 210.

Moreover, one or more photo sensors 29 may be further disposed in an lower end of the monitor frame 20. The photo sensor includes a light emitting part and a light receiving part. Herein, the light receiving part receives light emitted from the light emitting part, and thus, the photo sensor detects whether an object exists on a corresponding path.

In the embodiment, when an obstacle (for example, a person's hand, and other objects) is in a receiving space formed inside the body housing 10 while the monitor frame 20 is descending (i.e., close) from a vertically ascended location with respect to the body housing 10, the one or more photo sensors 29 disposed in an lower end of the monitor frame 20 senses the obstacle.

A sensing signal detected by the photo sensor 29 is transmitted to a Printed Circuit Board (PCB), including a controller and power source of the below-described motor 310, through an internal electric line. The controller switches the rotational direction of the motor 310 to a reverse direction to again lift the monitor frame 20, according to the sensing signal.

As an embodiment, in order to prevent an error from occurring in sensing an obstacle, a plurality of photo sensors 29 may be installed in the lower end of the monitor frame 20. Only when obstacle sensing signals more than a predetermined number of obstacle sensing signals are received from the photo sensors 29 (for example, a case where five photo sensors are installed, and sensing signals are received from three or more photo sensors among the five photo sensors), the controller outputs a control signal that allows the rotational direction of the motor 310 to be switched to a reverse direction.

As another embodiment, the photo sensor 29 senses an obstacle that exists in a lower surface of the monitor frame 20, and delivers a measured distance between the obstacle and the lower surface of the monitor frame 29 to the controller. In this case, the controller may differently control the rotational direction of the motor 310 according to the measured distance. For example, the controller determines whether the measured distance is greater than a predetermined value. When the measured distance is greater than the predetermined value, the controller may output a control signal that allows the rotational direction of the motor 310 to be maintained as-is, but when the measured distance is not greater than the predetermined value, the controller may output a control signal that allows the rotational direction of the motor 310 to be switched to a reverse direction.

According to the embodiment, the pop-up monitor may further include a warning unit that emits warning sound. When an obstacle sensing signal is received from the photo sensor 29 while the monitor frame 20 is descending, the controller controls the warning unit to be driven, and determines whether a measured distance between the obstacle and the monitor frame 20 is greater than the predetermined value. When the measured distance is greater than the predetermined value, the controller may outputs a control signal that allows a rotational speed of the motor 310 to be reduced, but when the measured distance is not greater than the predetermined value, the controller may outputs a control signal that allows a rotational direction of the motor 310 to be switched to a reverse direction.

The driving unit 30 includes the motor 310, a first gear set 320, a rotational shaft 330, a second gear set 340, and a spur gear set 350 and 360. The driving unit 30 will be specifically described below with reference to FIG. 5.

Figure 7:
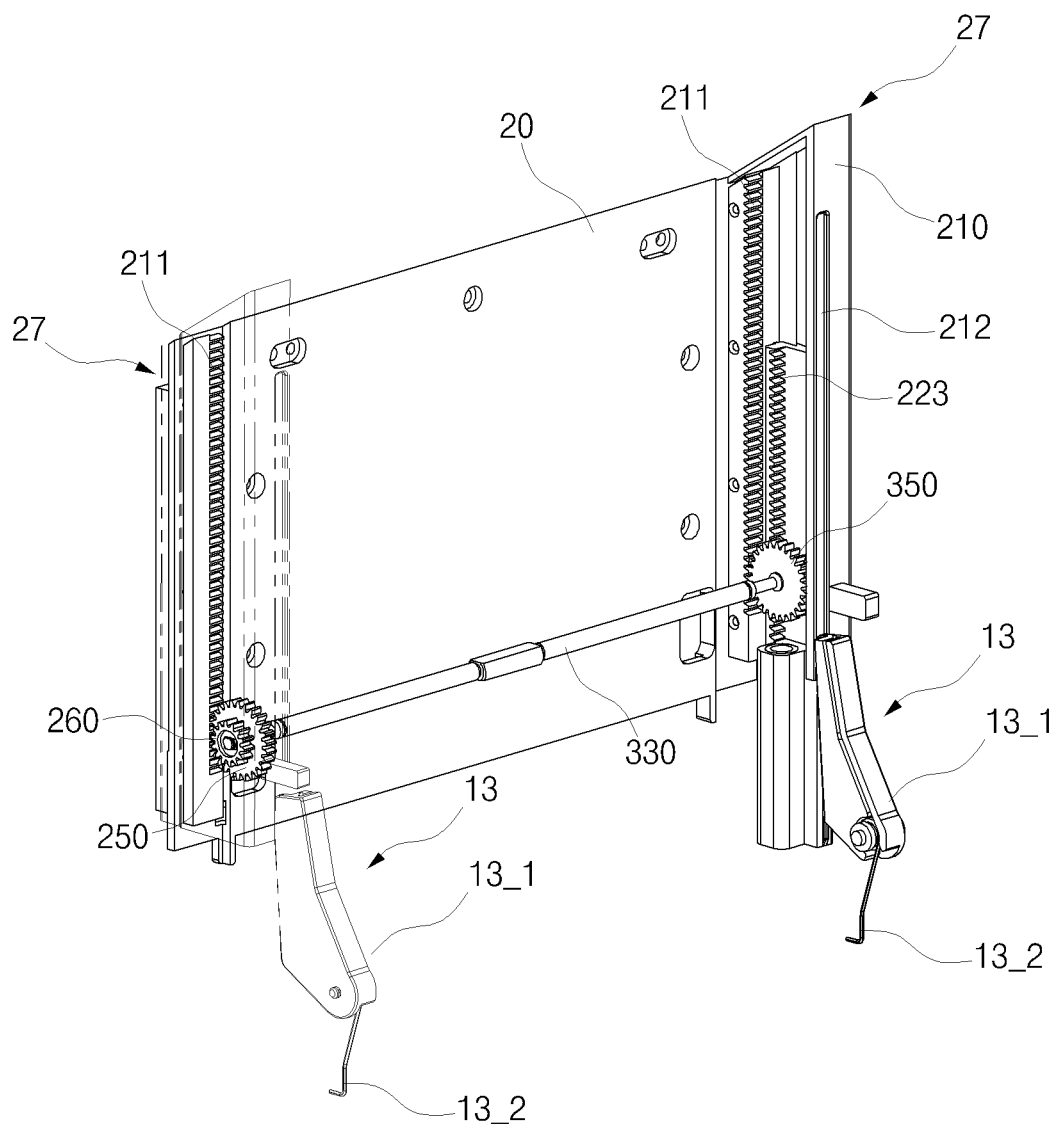
FIG.7 is perspective view illustrating a body housing which includes a damping spring for supporting a vertical motion of a rack gear set, according to another embodiment of the present invention.

FIG. 7 is a sectional view illustrating a driving unit according to an embodiment of the present invention.

Referring to FIG. 7, the driving unit 30 is provided in the body housing 10, and is installed on a bracket 370 that is provided across an upper portion of the body housing 10.

The motor 310 is installed in one end of the bracket 370, and the PCB (not shown) including the controller and power source of the motor 310 is disposed on the bracket 370.

A rotational motion of the motor 310 is transferred to the rotational shaft 330 by the first and second gear sets 320 and 340 that are disposed in the bracket 370.

Herein, the first gear set 320 includes a worm gear 321 that is disposed in an end of a driving shaft 311 in the motor 310, a clutch gear 323 that is coupled to the worm gear 321, and a complex gear 324 that is coupled to the clutch gear 323.

Figure 6:
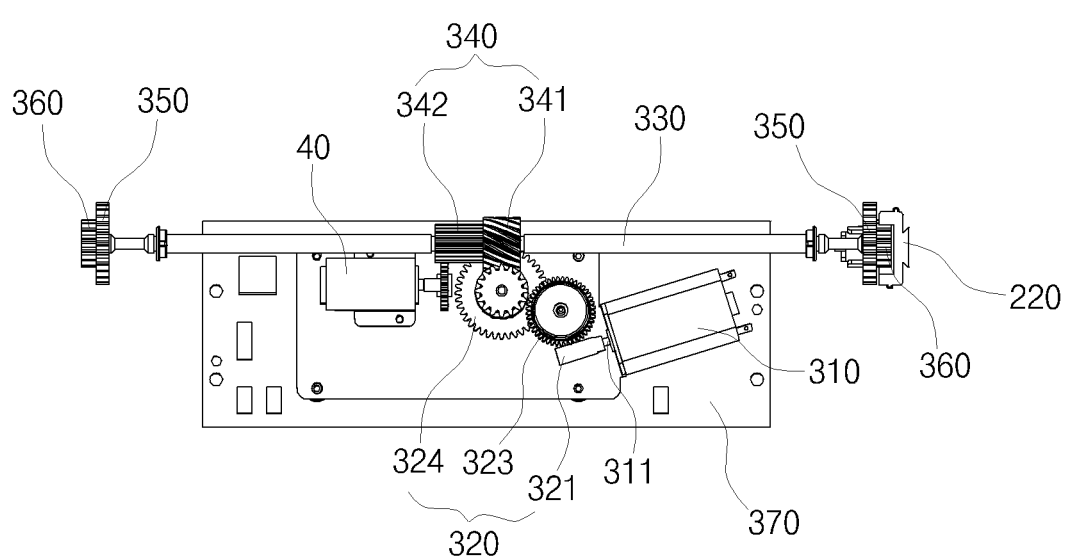
FIG. 6 is a sectional view illustrating a driving unit according to an embodiment of the present invention.

FIG. 6 is a view illustrating an internal detailed structure of a clutch gear according to an embodiment of the present invention.

Referring to FIG. 6, the clutch gear 323 is a complex gear that is configured with a helical gear 323_2 disposed in an upper portion of a shaft 323_1, and a spur gear 323_3 disposed in a lower portion of the shaft 323_1.

An extension spring 323_4 is disposed in the helical gear 323_2, and supports a torque of the helical gear 323_2 and an external force applied to the helical gear 323_2. A friction pad 323_5 is placed between the helical gear 323_2 and the spur gear 323_3, and spatially separates the helical gear 323_2 and the spur gear 323_3.

A motive power of the motor 310 is transferred to the clutch gear 323 by gear coupling between the worm gear 321 installed in the end of the driving shaft 311 and the clutch gear 323. The helical gear 323_2 and spur gear 323_3 configuring the clutch gear 323 transfer a motive power to the complex gear 324 while rotating integrally by a frictional force that is generated by the friction pad 323_5. In this case, the helical gear 323_2 disposed in the upper portion of the clutch gear 323 and the helical gear of the complex gear 324 are disposed to be separated from each other, and the spur gear 323_3 disposed in the lower portion of the clutch gear 323 and the spur gear of the complex gear 324 are coupled to each other to transfer a motive power.

When an external force is applied to the clutch gear 323 due to an external force given to the monitor frame 20, slidingness occurs in the friction pad 323_5 placed in the clutch gear 323, and therefore, the spur gear 323_3 disposed in the lower portion of the clutch gear 323 cannot receive a motive power from the helical gear 323_2 disposed in the upper portion of the clutch gear 323.

That is, when an external force is applied, the motor 310 is normally driven, but due to slidingness occurring in the friction pad 323_5, the motive power of the motor 310 is not transferred to the complex gear 324, the rotational shaft 30, etc. Such a limitation is sensed by a rotary sensor, and its detailed description will be described below.

In the complex gear 324, the helical gear disposed in an upper portion thereof and the spur gear disposed in a lower portion thereof are coupled integrally and simultaneously rotate with respect to the same shaft. A motive power in the clutch gear 323 is transferred to the spur gear, and thus, the helical gear rotates simultaneously with the spur gear.

The rotational shaft 330 is configured with the second gear set 340. The second gear set 340 includes the helical gear 341 that is installed to be rotatable through gear coupling with the helical gear configuring the complex gear 324, and the spur gear 342 that is fixed and coupled to the helical gear 341 to rotate simultaneously with the helical gear 341.

That is, a motive power transferred to the complex gear 324 is transferred to the second gear set 340 through gear coupling between the helical gear configuring the complex gear 324 and the helical gear configuring the second gear set 340, and thus, the second gear set 340 and the rotational shaft 330 are coupled integrally and rotate simultaneously.

The spur gear set 350 and 360 that is installed so as to enable integral rotation is disposed in each of both ends of the rotational shaft 330.

The spur gear set 350 and 360 is fixed and coupled to each of both ends of the rotational shaft 330, and is respectively coupled to engage the spur gear teeth 211 and 223 that are respectively formed inside a portion of the outer gear 210 and a portion of the inner gear 220.

Therefore, a rotational motion generated by the motor 310 is transferred to the outer gear 210 and the inner gear 220 by the spur gear set 350 and 360. The outer gear 210 and the inner gear 220 change the rotational motion to a rectilinear motion and thus ascend/descend in a vertical direction with respect to the body housing 10, respectively.

The spur gear set 350 and 360 is configured with first and second spur gears 350 and 360 that are provided to have different diameters. The diameter of the first spur gear 350 is greater than that of the second spur gear 360, and is coupled in engagement with the spur gear teeth 211 that is provided inside the outer gear 210. The spur gear 360 is coupled in engagement with the spur gear teeth 223 that is provided inside the inner gear 220.

The spur gear set 350 and 360 having different diameters rotates integrally with the rotational shaft 330 to have the same angular velocity, but provides different linear velocities to the outer gear 210 and the inner gear 220. Therefore, the outer gear 210 may have a linear velocity greater than that of the inner gear 230 and ascend/descend in a vertical direction.

As illustrated in FIG. 7, a rotary sensor 40 that senses the transfer of a motive power from the driving unit 30 may be further disposed on the bracket 370 that is provided across an upper portion of the body housing 10.

The rotary sensor 40 is disposed to be separated from the complex gear 324 with a certain space therebetween. The rotary sensor 40 is coupled to the spur gear of the second gear set 340 that is driven integrally with the rotational shaft 330, and thus is rotation-driven identically to the rotational shaft 330.

While the motive power is normally being transferred, the motive power of the motor 310 is transferred to the rotational shaft 330 as-is, and thus, the rotational shaft 330 also rotates in the rotational direction of the motor 310. At this point, the rotary sensor 40 rotates identically to the rotational shaft 330 to output a normal state signal.

When the motive power is abnormally transferred, for example, when an external force exceeding a predetermined reference is given to the monitor frame 20, the motive power of the motor 310 is not transferred to the rotational shaft 330 due to the structural feature of the clutch gear 323.

Therefore, even when the motor 310 is rotating, the rotational shaft 330 does not rotate, and moreover, the rotary sensor 40 coupled to the rotational shaft 330 does not rotate. That is, even though the motor 310 is rotating, when the rotary sensor 40 does not rotate, this is determined as an abnormal state by the rotary sensor 40, and thus, the rotary sensor 40 outputs an abnormal state signal.

The normal or abnormal state signal outputted from the rotary sensor 40 is transmitted to the PCB, which is configured with the controller and power source of the motor 310, through an internal electric line. The controller outputs a control signal that allows the rotational direction of the motor 310 to be switched to a reverse direction, according to the sensing signal.

That is, the controller controls the rotational direction of the motor 310 according to state information regarding whether the rotational shaft 330 rotates and state information regarding whether the motor 310 rotates, and its detailed description will be described below.

As an embodiment, while the monitor frame 20 is ascending/descending in a vertical direction with respect to the body housing 10, when the motive power is normally transferred, the motor 310 and the rotational shaft 330 rotate together. However, when the motive power is abnormally transferred, the motor 310 rotates, but the rotational shaft 330 does not rotate. In this case, the controller, which receives state information regarding whether the rotational shaft 330 rotates and state information regarding whether the motor 310 rotates, determines an external force as being given to the pop-up monitor and controls the motor 310 to rotate in a reverse direction with respect to the original rotational direction. That is, while the monitor frame 20 is ascending, when an external force is applied to the pop-up monitor, the controller controls the rotational direction of the motor 310 in a reverse direction in order for the monitor frame 20 to descend. While the monitor frame 20 is descending, when an external force is applied to the pop-up monitor, the controller controls the rotational direction of the motor 310 in a reverse direction such that the monitor frame 20 ascends.

As another embodiment, in a state where the monitor frame 20 has ascended to the maximum with respect to the body housing 10, when an external force is applied to the pop-up monitor, the motor 310 is in a stopped state, but the rotational shaft 330 may rotate by the external force.

That is, when the controller receives state information indicating that the rotational shaft 330 is rotating when the monitor frame 20 has been opened and state information indicating that the motor 310 does not rotate, the controller controls the rotational direction of the motor 310 in a direction where the monitor frame 20 descends.

In the above description, the state information regarding the rotation of the rotational shaft 330 has been described as being obtained from the sensing signal of the rotary sensor 40, but the spirit and scope of the embodiments are not limited thereto. The spirit and scope of the embodiments should be construed as including other elements for obtaining the state information regarding the rotation of the rotational shaft 330.

Figure 8:
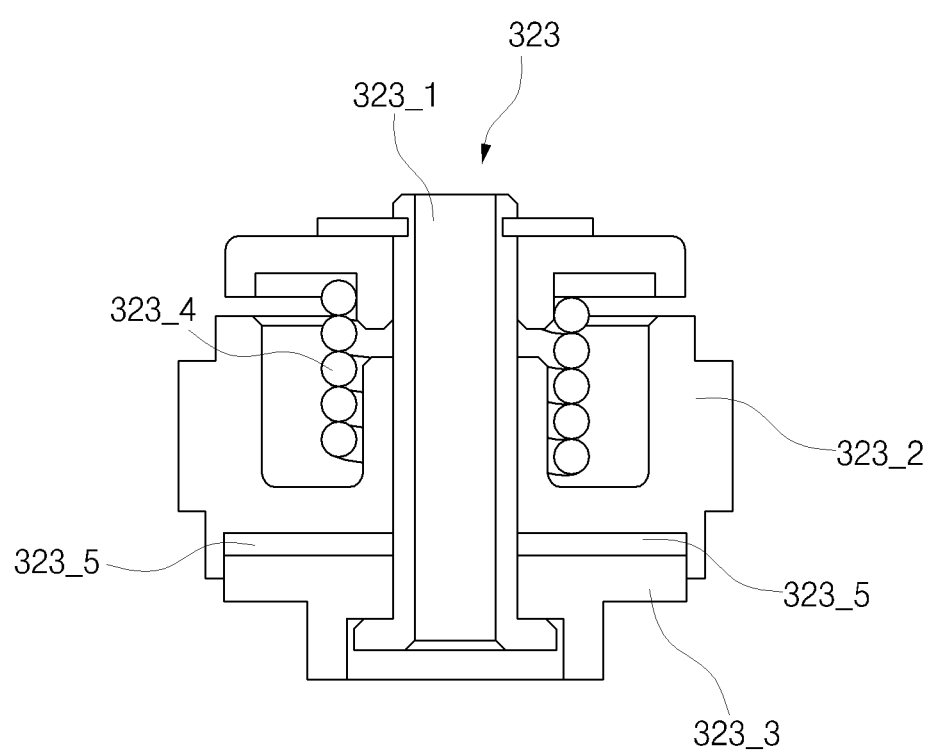
FIG. 8 is a view illustrating an internal detailed structure of a clutch gear according to an embodiment of the present invention.

As another embodiment, as illustrated in FIG. 8, a damping spring 13 for supporting the vertical motion of the rack gear set 27 may be disposed in each of both sides of the body housing 10.

As described above, the rack gear set 27 receives the motive power of the motor 310 though gear coupling with the spur gear set 350 and 360 of the driving unit 30. At this point, a gap is formed between the spur gear and the rack gear, and consequently, when the monitor frame 20 ascends/descends, shaking occurs in proportion to the gap. Also, rattle noise is caused by the shaking of the monitor due to the vibration of the vehicle.

In order to solve limitations such as the shaking of the monitor due to the gap between the gears and noise due to the shaking, in the embodiment, the pop-up monitor is characterized by including the damping spring 13 that supports the vertical motion of the rack gear set 27.

Specifically, the damping spring 13 is disposed in each of the both sides of the body housing 10, and configured with a case-damping spring 13_1 and a torsion spring 13_2.

A groove 212 is formed along a length direction, at an outer surface of the outer gear 210 of the rack gear set 27. When the monitor frame 20 ascends/descends, the damping spring 13 applies a constant pressure to the outer gear 210 along the groove 212.

The torsion spring 13_2 of an elastic material applies a constant moment to the case-damping spring 13_1 when assembled with the case-damping spring 13_1. Due to the moment, the damping spring 13 continuously applies a constant pressure to groove 212 that is formed at the outer surface of the outer gear 210.

The pressure applied from the damping spring 13 removes a gap between the rack gear set 27 and the spur gear set 350 and 360, and thus, shaking is prevented from occurring when the monitor frame 20 ascends/descends.

The rack gear structure may further include a pressurizing member applying a pressure in a direction perpendicular to a vertical moving direction of the outer gear.

A groove having a certain width is formed along a length direction, in an outer surface of the outer gear. When the monitor frame ascends or descends in a vertical direction, the pressurizing member continuously applies a constant pressure to the outer gear along the groove.

The pressurizing member includes a case-damping spring installed to be externally touched to the linear outer gear; and a torsion spring assembled with the case-damping spring to apply a moment to the case-damping spring.

The rack gear structure may include a linear outer gear coupled to the monitor frame, and a linear inner gear disposed inside the outer gear. The linear inner gear ascends or descends according to an ascending or descending motion of the linear outer gear.

The linear outer gear ascends within a distance range of about 100 mm to 130 mm, and the linear inner gear ascends within a distance range of about 50 mm to 65 mm according to an ascending motion of the linear outer gear.

The linear outer gear ascends within a distance range of about 105 mm to 115 mm, and the linear inner gear ascends within a distance range of about 55 mm to 60 mm according to an ascending motion of the linear outer gear.

The linear outer gear and the linear inner gear ascend to the maximum, the linear outer gear and the linear inner gear overlap with each other within a distance range of about 80 mm to 95 mm.

According to embodiments of the present invention, the vertical motion of the monitor frame is supported by the rack gear set, which includes the outer gear that is fixed and coupled to the monitor frame to directly induce the vertical motion of the monitor frame, and the inner gear that is received in the internal space through rail coupling with the outer gear.

That is, the rack gear set is characterized by having the double rack gear structure of the outer gear and inner gear. Herein, the inner gear is not directly associated with the vertical motion of the monitor frame, but when the inner gear ascends simultaneously with the outer gear and then the outer gear has ascended to the maximum, by maximizing a portion overlapping with the outer gear, the inner gear can support forward and rearward/right and left shaking that occurs in the outer gear.

Moreover, in embodiments of the present invention, the receiving space for receiving portable equipment or the like is formed in the body housing, and a connector, a USB port, etc. for supplying a power to the portable equipment or communicating with the portable equipment are provided in one side of the body housing, thus enhancing a user's convenience.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rack gear structure of a pop-up monitor which is connected to a monitor frame of the pop-up monitor to enable a vertical motion of the monitor frame, the rack gear structure comprising:
    an outer gear coupled at a side of the monitor frame to operate integrally with the monitor frame, and enabling the vertical motion of the monitor frame with an ascending or descending motion, and
    an inner gear received inside the outer gear, wherein the inner gear performs an ascending or descending motion simultaneously with the outer gear, and supports forward and rearward or right and left shaking, which occurs in the outer gear, by maximizing a portion overlapping with the outer gear when the outer gear has ascended to the maximum.

2. The rack gear structure of claim 1, wherein,
    a rail groove is formed along a length direction, at one surface inside the outer gear, and
    a rail is formed along a length direction, at one surface of the inner gear, and the inner gear is received inside the outer gear through coupling between the rail and the rail groove.

3. The rack gear structure of claim 1, wherein,
    a spur gear teeth is formed in one row along a length direction, at one side inside the outer gear, and
    a spur gear teeth is formed in one row along a length direction, at one side inside the inner gear.

4. The rack gear structure of claim 1, wherein a through hole is formed in the inner gear, a guide shaft being disposed in the through hole.

5. The rack gear structure of claim 1, wherein,
    the outer gear changes a first rotational motion, transferred from a motor, to a first rectilinear motion, and
    the inner gear changes a second rotational motion, transferred from the motor, to a second rectilinear motion.

6. The rack gear structure of claim 1, wherein,
    the outer gear and the inner gear are coupled to a driving unit which transfers a rotational motion generated by a motor,
    the driving unit comprises a spur gear set configured with first and second spur gears,
    the first spur gear is coupled to the outer gear, and
    the second spur gear is coupled to the inner gear.

7. The rack gear structure of claim 6, wherein,
    the first spur gear and the second spur gear are coupled to rotate integrally, and
    a diameter of the first spur gear is formed greater than a diameter of the second spur gear.

8. The rack gear structure of claim 6, wherein,
    the driving unit comprises: a motor; a first gear set transferring a torque of the motor to a rotational shaft; a second gear set coupled to the first gear set; and a rotational shaft rotating according to an output of the motor, and
    the first and second spur gears are fixed and coupled to both ends of the rotational shaft, respectively.

9. The rack gear structure of claim 8, wherein the first gear set comprises:
    a clutch gear coupled to a worm gear which is installed in a driving shaft of the motor; and
    a complex gear coupled to the clutch gear.

10. The rack gear structure of claim 9, wherein,
    the clutch gear comprises: a shaft; a helical gear disposed in an upper portion with respect to the shaft; a spur gear disposed in a lower portion with respect to the shaft; an extension spring placed inside the helical gear; and a friction pad placed between the helical gear and the spur gear,
    the helical gear is coupled to a worm which is installed in the driving shaft to receive a motive power from the motor, and
    the spur gear is coupled to the complex gear while rotating integrally with the helical gear to transfer a motive power.

11. The rack gear structure of claim 9, wherein,
    the clutch gear comprises a helical gear in an upper portion thereof, and a spur gear in a lower portion thereof,
    the helical gear is coupled to the worm gear installed in the driving shaft to receive a motive power from the motor, and
    the spur gear is coupled to the complex gear while rotating integrally with the helical gear to transfer a motive power.

12. The rack gear structure of claim 11, wherein the second gear set is configured with a complex gear which is fixed and coupled to the rotational shaft and comprises a helical gear and a spur gear which rotate integrally with the rotational shaft, the helical gear of the second gear set being coupled to the helical gear of the complex gear to receive a motive power.

13. The rack gear structure of claim 1, further comprising a pressurizing member applying a pressure in a direction perpendicular to a vertical moving direction of the outer gear.

14. The rack gear structure of claim 13, wherein,
    a groove having a certain width is formed along a length direction, in an outer surface of the outer gear, and
    the pressurizing member continuously applies a constant pressure to the outer gear along the groove, when the monitor frame ascends or descends in a vertical direction.

15. A rack gear structure of a pop-up monitor including a monitor frame which ascends and descends, the rack gear structure comprising:
- a linear outer gear coupled to the monitor frame; and
- a linear inner gear disposed inside the outer gear,
- wherein the linear inner gear is configured to ascend or descend according to an ascending or descending motion of the linear outer gear.

16. The rack gear structure of claim 15, wherein,
- the linear outer gear is configured to ascend within a distance range of about 100 mm to 130 mm, and
- the linear inner gear is configured to ascend within a distance range of about 50 mm to 65 mm according to an ascending motion of the linear outer gear.

17. The rack gear structure of claim 15, wherein,
- the linear outer gear is configured to ascend within a distance range of about 105 mm to 115 mm, and
- the linear inner gear is configured to ascend within a distance range of about 55 mm to 60 mm according to an ascending motion of the linear outer gear.

18. The rack gear structure of claim 15, wherein when the linear outer gear and the linear inner gear ascend to maximum respective distances, the linear outer gear and the linear inner gear overlap with each other within a distance range of about 80 mm to 95 mm.

19. The rack gear structure of claim 15, further comprising a pressurizing member configured to apply a pressure in a direction perpendicular to a vertical moving direction of the linear outer gear.

20. The rack gear structure of claim 19, wherein the pressurizing member comprises:
- a case-damping spring externally contacting the linear outer gear; and
- a torsion spring assembled with the case-damping spring and configured to apply a moment to the case-damping spring.

* * * * *